United States Patent [19]
Mannava et al.

[11] Patent Number: 5,531,570
[45] Date of Patent: Jul. 2, 1996

[54] DISTORTION CONTROL FOR LASER SHOCK PEENED GAS TURBINE ENGINE COMPRESSOR BLADE EDGES

[75] Inventors: Seetha R. Mannava; James D. Risbeck, both of Cincinnati; Larry G. Jacobs, Loveland, all of Ohio

[73] Assignee: General Electric Company, Cincinnati, Ohio

[21] Appl. No.: 399,287

[22] Filed: Mar. 6, 1995

[51] Int. Cl.$^6$ ........................................................ F01D 5/14
[52] U.S. Cl. ........................................ 416/241 R; 29/889.1; 29/889.2; 219/121.65; 219/121.66; 219/121.85
[58] Field of Search ............................ 416/241 R, 223 A; 29/889.1, 889.2; 219/121.65, 121.66, 121.85

[56] References Cited

U.S. PATENT DOCUMENTS

| | | |
|---|---|---|
| 3,566,662 | 3/1971 | Champoux . |
| 3,576,070 | 4/1971 | Parsons .............................. 416/223 R |
| 3,689,176 | 9/1972 | Howell et al. . |
| 3,850,698 | 11/1974 | Mallozzi et al. . |
| 4,002,403 | 1/1977 | Mallozzi et al. . |
| 4,060,769 | 11/1977 | Mallozzi et al. . |
| 4,401,477 | 8/1983 | Clauer et al. . |
| 4,426,867 | 1/1984 | Neal et al. ................................ 72/53 |
| 4,557,033 | 12/1985 | Champoux . |
| 4,795,313 | 1/1989 | Coulon ................................... 416/224 |
| 4,832,252 | 5/1989 | Fraser ................................ 416/241 R |
| 4,934,170 | 6/1990 | Easterbrook et al. . |
| 4,937,421 | 6/1990 | Ortiz, Jr. et al. . |
| 5,033,938 | 7/1991 | Fraser et al. ........................... 29/889.1 |
| 5,127,019 | 6/1992 | Epstein et al. . |
| 5,131,957 | 7/1992 | Epstein et al. . |
| 5,226,785 | 6/1993 | Narayana et al. . |
| 5,306,360 | 4/1994 | Bharti et al. . |
| 5,307,622 | 5/1994 | Ciokajlo et al. . |
| 5,351,395 | 10/1994 | Crawmer et al. ....................... 29/889.1 |

FOREIGN PATENT DOCUMENTS

| | | | |
|---|---|---|---|
| 0005187 | 1/1977 | Japan .................................. 416/241 R |
| 0052310 | 4/1979 | Japan .................................. 416/241 R |
| 0064104 | 5/1980 | Japan .................................. 416/241 R |
| 0215905 | 12/1984 | Japan ..................................... 416/224 |
| 0195050 | 7/1923 | United Kingdom ................... 416/224 |

OTHER PUBLICATIONS

"Laser Shock Processing Increases the Fatigue Life of Metal Parts" Sep. 1991 Materials and Processing Report.
"Jet Engines And Propulsion Systems For Engineers", Human Resources Development, GE Aircraft Engines, by Thaddeus W. Fowler, Ed.D., 1989.
American Machinist, "Laser Shocking Extends Fatigue Life", by John A. Vaccari, pp. 62–64, Jul. 1992, A Penton Publication.

*Primary Examiner*—Edward K. Look
*Assistant Examiner*—Mark Sgantzos
*Attorney, Agent, or Firm*—Andrew C. Hess; David L. Narciso

[57] ABSTRACT

A method for counteracting distortion of the airfoil caused by laser shock peening a gas turbine engine compressor metallic airfoil along its leading and/or trailing edge to form laser shock peened surfaces extending radially along at least a portion of the edges with a region having deep compressive residual stresses imparted by laser shock peening (LSP) extending into the airfoil from the laser shock peened surfaces.

24 Claims, 4 Drawing Sheets

DISTORTION CONTROL FOR LASER SHOCK PEENED GAS TURBINE ENGINE COMPRESSOR BLADE EDGES

RELATED PATENT APPLICATIONS

The present Application deals with related subject matter in co-pending U.S. patent Ser. No. 08/319,346, entitled "LASER SHOCK PEENED ROTOR COMPONENTS FOR TURBOMACHINERY", filed Oct. 6, 1994, assigned to the present Assignee, and having three inventors in common with the present application.

The present Application deals with related subject matter in co-pending U.S. patent Ser. No. 08/(GE ATTORNEY DOCKET NO. 13DV-12142), entitled "LASER SHOCK PEENED GAS TURBINE ENGINE COMPRESSOR BLADE EDGES", filed November, 1994, assigned to the present Assignee, and having inventors in common with the present application.

The present Application deals with related subject matter in co-pending U.S. patent Ser. No. 08/363,362, entitled "ON THE FLY LASER SHOCK PEENING", filed Dec. 22, 1994, assigned to the present Assignee, and having one inventor in common with the present application.

BACKGROUND OF THE INVENTION

Field of the Invention

This invention relates to gas turbine engine rotor blades with leading and trailing edges having localized compressive residual stresses imparted by laser shock peening and, more particularly, to techniques for controlling and countering distortion of the airfoils of these blades.

Description of Related Art

Gas turbine engines and, in particular, aircraft gas turbine engines rotors operate at high rotational speeds that produce high tensile and vibratory stress fields within the blade and make the compressor blades susceptible to foreign object damage (FOD). Vibrations may also be caused by vane wakes and inlet pressure distortions as well as other aerodynamic phenomena. This FOD causes nicks and tears and hence stress concentrations in leading and trailing edges of compressor blade airfoils. These nicks and tears become the source of high stress concentrations or stress risers and severely limit the life of these blades due to High Cycle Fatigue (HCF) from vibratory stresses. FOD damage may also result in a loss of engine due to a release of a failed blade. It is also expensive to refurbish and/or replace compressor blades and, therefore, any means to enhance the rotor capability and, in particular, to extend aircraft engine compressor blade life is very desirable. The present solution to the problem of extending the life of compressor blades is to design adequate margins by reducing stress levels to account for stress concentration margins on the airfoil edges. This is typically done by increasing thicknesses locally along the airfoil leading edge which adds unwanted weight to the compressor blade and adversely affects its aerodynamic performance. Another method is to manage the dynamics of the blade by using blade dampers. Dampers are expensive and may not protect blades from very severe FOD. These designs are expensive and obviously reduce customer satisfaction.

Therefore, it is highly desirable to design and construct longer lasting compressor blades that are better able to resist both low and high cycle fatigue than present compressor blades. The present invention is directed towards this end and provides a compressor blade with regions of deep compressive residual stresses imparted by laser shock peening leading and optionally trailing edge surfaces of the compressor blade.

The region of deep compressive residual stresses imparted by laser shock peening of the present invention is not to be confused with a surface layer zone of a work piece that contains locally bounded compressive residual stresses that are induced by a hardening operation using a laser beam to locally heat and thereby harden the work piece such as that which is disclosed in U.S. Pat. No. 5,235,838, entitled "Method and Apparatus for Truing or Straightening Out of True Work Pieces". The present invention uses multiple radiation pulses from high power pulsed lasers to produce shock waves on the surface of a work piece similar to methods disclosed in U.S. Pat. No. 3,850,698, entitled "Altering Material Properties"; U.S. Pat. No. 4,401,477, entitled "Laser Shock Processing"; and U.S. Pat. No. 5,131,957, entitled "Material Properties". Laser peening as understood in the art and as used herein, means utilizing a laser beam from a laser beam source to produce a strong localized compressive force on a portion of a surface. Laser peening has been utilized to create a compressively stressed protection layer at the outer surface of a workpiece which is known to considerably increase the resistance of the workpiece to fatigue failure as disclosed in U.S. Pat. No. 4,937,421, entitled "Laser Peening System and Method" discloses compressor blades and methods for manufacturing such blades with regions of deep compressive residual stresses imparted by laser shock peening (LSP) extending from the laser shock peened surface into the blade along leading and/or trailing edges. There are associated distortions of thin compressor blades that alter the profile of the blade and therefore cause substantial aerodynamic problems. It is to this end that the present invention is directed.

SUMMARY OF THE INVENTION

The present invention provides a gas turbine engine compressor blade and a method of manufacturing such a blade having at least one laser shock peened surface along the leading and/or trailing edges of the blade and a region of deep compressive residual stresses imparted by laser shock peening (LSP) extending from the laser shock peened surface into the blade and a means in the form of a feature of the blade or a method to counter distortion of the airfoil due to the laser shock peening. The blade may have laser shock peened surfaces on both suction and pressure sides of the blade wherein both sides were simultaneously laser shock peened. The present invention can be used for new, used, and repaired compressor blades.

One embodiment of the invention includes a feature of and a method to manufacture the blade with a laser shock peened patch near the tip such that the patch has a laser shock peened surfaces on the leading and/or trailing edge of the blade on at least one of the suction and pressure sides of the blade. The patch extends radially from the tip along a the portion of the leading edge. A more particular embodiment provides that the portion is about 50% of a distance from the tip to the platform of the blade.

Another embodiment of the invention provides compression side and suction side patterns of circular laser shocked areas such that the suction side pattern is different from the compression side pattern and each of the patterns includes overlapping rows of circular laser shocked areas. Each of the rows have overlapping circular laser shocked areas and generally equally spaced apart linearly aligned center points. A more particular embodiment provides a different number of overlapping rows on the suction side than on the pressure side. Another more particular embodiment of the invention provides compressor side circular laser shocked areas formed with a laser beam having a first strength different than a laser beam having a second strength used to form the suction side circular laser shocked areas.

In another embodiment of the invention the airfoil is formed with a pre-twist prior to formation of the laser shock peened surfaces such that the airfoil has a final predetermined twist after the airfoil is laser shock peened that is different from the pre-twist.

Another embodiment provides a method to form overlapping rows of circular laser shocked areas with each of the rows having overlapping circular laser shocked areas and generally equally spaced apart linearly aligned center points that are generally parallel to the leading edge. The rows are laser shock peened in order starting with a row furthest away from the leading edge.

Another embodiment provides at least one overlapping row of circular laser shocked areas having overlapping circular laser shocked areas that are generally equally spaced apart and have linearly aligned center points that are generally parallel to the leading edge. The rows extend from the tip to the platform and are laser shock peened radially outward in order starting from the platform to the tip.

ADVANTAGES

Among the advantages provided by the present invention is the improved ability to safely build gas turbine engine blades designed to operate in high tensile and vibratory stress fields which can better withstand fatigue failure due to nicks and tears in the leading and trailing edges of the compressor blade and have an increased life over conventionally constructed compressor blades. Another advantage of the present invention is that compressor blades can be constructed with commercially acceptable life spans without increasing thicknesses along the leading and trailing edges, as is conventionally done, thus avoiding unwanted weight on the blade. Another advantage of constructing compressor blades with without increasing thicknesses along the leading and trailing edges is improved aerodynamic performance of the airfoil that is available for blades with thinner leading and trailing edges. The present invention makes it possible to provide new and refurbished compressor blades with enhanced capability and in particular extends the compressor blade life in order to reduce the number of refurbishments and/or replacements of the blades. The present invention also allows aircraft engine compressor blades to be designed with adequate margins by increasing vibratory stress capabilities to account for FOD or other compressor blade damage without beefing up the area along the leading edges which increase the weight of the compressor blade and engine. The present invention can be advantageously used to refurbish existing compressor blades in order to ensure safe and reliable operation of older gas turbine engine compressor blades while avoiding expensive redesign efforts or frequent replacement of suspect compressor blades as is now often done or required. The apparatus and methods of the present invention provide the advantage of using laser shock peening on thin compressor blades edges with a minimal amount of distortion and related undesirable aerodynamic performance losses.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
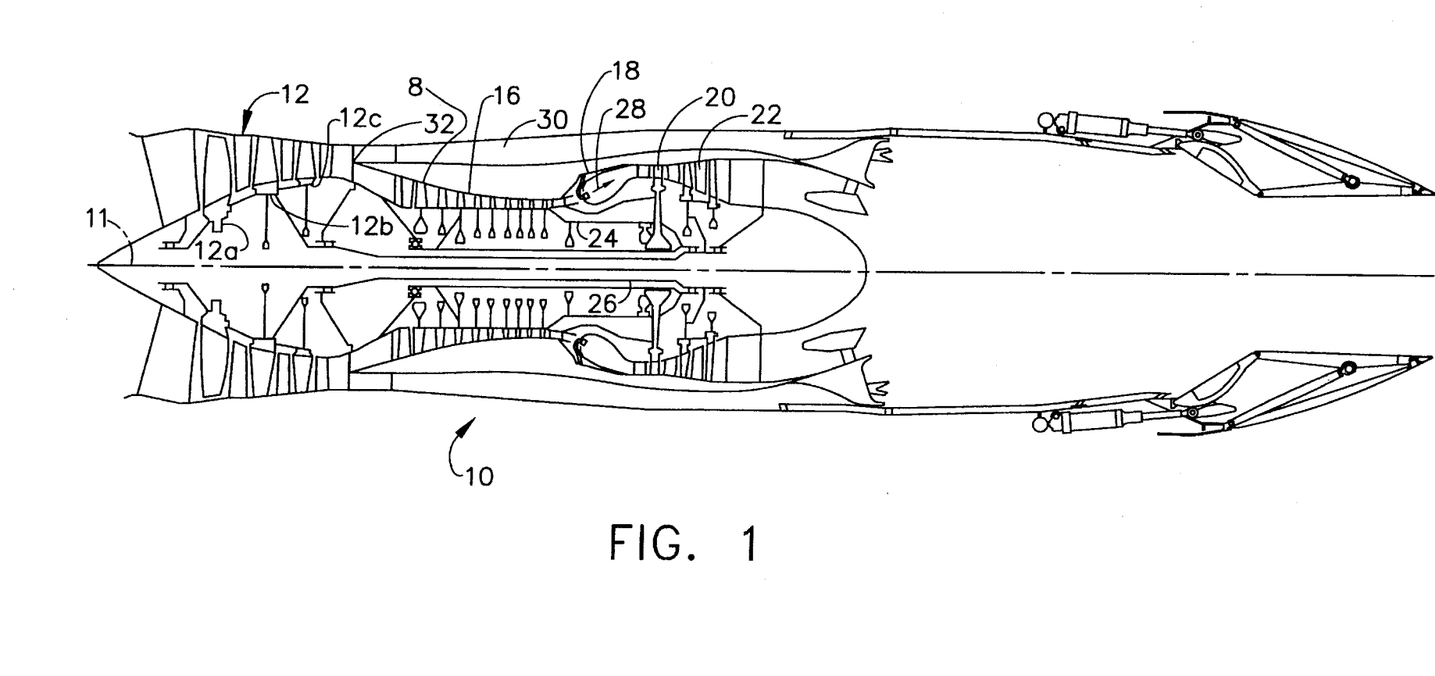
FIG. 1 is a cross-sectional illustrative view of an exemplary aircraft gas turbine engine in accordance with the present invention.

Illustrated in FIG. 1 is a schematic representation of an exemplary aircraft gas turbine engine 10 including a compressor blade 8 in accordance with one embodiment of the present invention. The gas turbine engine 10 is circumferentially disposed about an engine centerline 11 and has, in serial flow relationship, a fan section 12, a high pressure compressor 16, a combustion section 18, a high pressure turbine 20, and a low pressure turbine 22. The combustion section 18, high pressure turbine 20, and low pressure turbine 22 are often referred to as the hot section of the engine 10. A high pressure rotor shaft 24 connects, in driving relationship, the high pressure turbine 20 to the high pressure compressor 16 and a low pressure rotor shaft 26 drivingly connects the low pressure turbine 22 to the fan section 12. Fuel is burned in the combustion section 18 producing a very hot gas flow 28 which is directed through the high pressure and low pressure turbines 20 and 22 respectively to power the engine 10. A portion of the air passing through the fan section 12 is bypassed around the high pressure compressor 16 and the hot section through a bypass duct 30 having an entrance or splitter 32 between the fan section 12 and the high pressure compressor 16. Many engines have a low pressure compressor (not shown)

mounted on the low pressure rotor shaft 26 between the splitter 32 and the high pressure compressor 16. The fan section 12 is a multi-stage fan section as are may gas turbine engines as illustrated by three fan stages 12a, 12b, and 12c. The compressor blade 8 of the present invention is designed to be used in a single stage compressor section or in any stage of a multi-stage compressor section.

Figure 2:
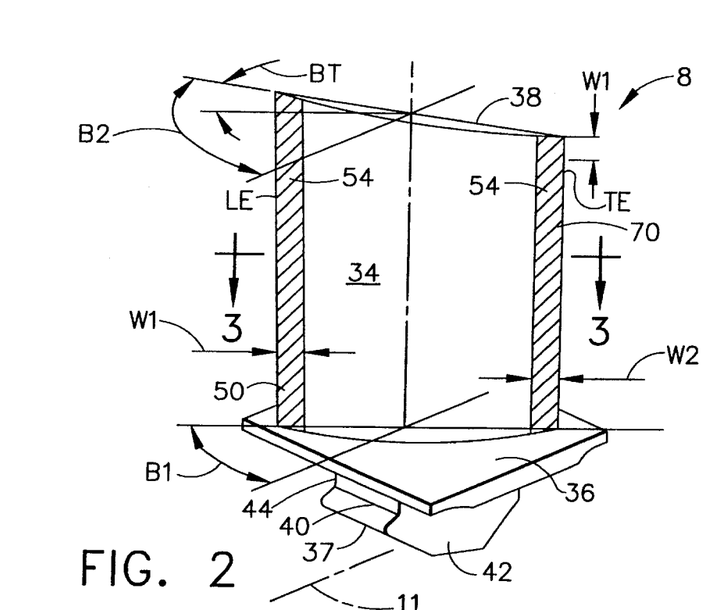
FIG. 2 is a perspective illustrative view of an exemplary aircraft gas turbine engine compressor blade in accordance with the present invention.
Figure 3:
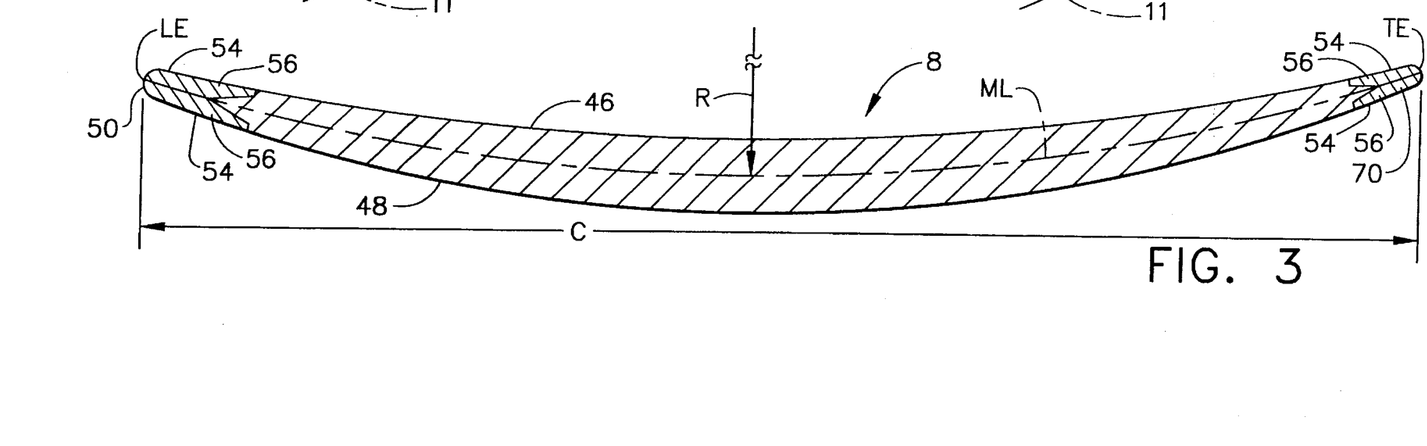
FIG. 3 is a cross sectional view through the compressor blade taken along line 3—3 as illustrated in FIG. 2.

Referring to FIGS. 2 and 3, the compressor blade 8 includes an airfoil 34 extending radially outward from a blade platform 36 to a blade tip 38. The compressor blade 8 includes a root section 40 extending radially inward from the platform 36 to a radially inward end 37 of the root section 40. At the radially inward end 37 of the root section 40 is a blade root 42 which is connected to the platform 36 by a blade shank 44. The airfoil 34 extends in the chordwise direction between a leading edge LE and a trailing edge TE of the airfoil. A chord C of the airfoil 34 is the line between the leading LE and trailing edge TE at each cross section of the blade as illustrated in FIG. 3. A pressure side 46 of the airfoil 34 faces in the general direction of rotation as indicated by the arrow and a suction side 48 is on the other side of the airfoil and a mean-line ML is generally disposed midway between the two faces in the chordwise direction. The airfoil 34 also has a twist whereby a chord angle varies from a first angle B1 at the platform 36 to a second angle B2 at the tip 38 for which the difference is shown by an angle differential BT. The chord angle is defined as the angle of the chord C with respect to the engine centerline 11.

Referring again to FIG. 2, compressor blade 8 has a leading edge section 50 that extends along the leading edge LE of the airfoil 34 from the blade platform 36 to the blade tip 38. The leading edge section 50 includes a predetermined first width W1 such that the leading edge section 50 encompasses nicks 52 and tears that may occur along the leading edge of the airfoil 34. The airfoil 34 subject to a significant tensile stress field due to centrifugal forces generated by the compressor blade 8 rotating during engine operation. The airfoil 34 is also subject to vibrations generated during engine operation and the nicks 52 and tears operate as high cycle fatigue stress risers producing additional stress concentrations around them.

To counter fatigue failure of portions of the blade along possible crack lines that can develop and emanate from the nicks and tears at least one and preferably both of the pressure side 46 and the suction side 48 have a laser shock peened surfaces 54 and a pre-stressed region 56 having deep compressive residual stresses imparted by laser shock peening (LSP) extending into the airfoil 34 from the laser shock peened surfaces as seen in FIG. 3. Preferably, the pre-stressed regions 56 are coextensive with the leading edge section 50 in the chordwise direction to the full extent of width W1 and are deep enough into the airfoil 34 to coalesce for at least a part of the width W1. The pre-stressed regions 56 are shown coextensive with the leading edge section 50 in the radial direction along the leading edge LE but may be shorter, extending from the tip 38 along a portion L1 of the way along the leading edge LE towards the platform 36.

The present invention also includes blade construction with only the trailing edge TE having laser shock peened surfaces 54 on a trailing edge section 70 having a second width W2 and along the trailing edge TE. The associated pre-stressed regions 56 having deep compressive residual stresses imparted by laser shock peening (LSP) extends into the airfoil 34 from the laser shock peened surfaces 54 on the trailing edge section 70. At least one and preferably both of the pressure side 46 and the suction side 48 have a laser shock peened surfaces 54 and a pre-stressed region 56 having deep compressive residual stresses imparted by laser shock peening (LSP) extending into the airfoil 34 from the laser shock peened surfaces on a trailing edge section along the trailing edge TE. Preferably, the compressive pre-stressed regions 56 are coextensive with the leading edge section 50 in the chordwise direction to the full extent of width W2 and are deep enough into the airfoil 34 to coalesce for at least a part of the width W2. The compressive pre-stressed regions 56 are shown coextensive with the leading edge section 50 in the radial direction along the trailing edge TE but may be shorter, extending from the tip 38 a portion of the way along the trailing edge TE towards the platform 36.

The laser beam shock induced deep compressive residual stresses in the compressive pre-stressed regions 56 are generally about 50–150 KPSI (Kilo Pounds per Square Inch) extending from the laser shocked peened surfaces 54 to a depth of about 20–50 mils into laser shock induced compressive residually pre-stressed regions 56. The laser beam shock induced deep compressive residual stresses are produced by repetitively firing a high energy laser beam that is focused on laser shock peened surface 54 which is covered with paint to create peak power densities or fluences having an order of magnitude of a gigawatt/cm$^2$. The laser beam is fired through a curtain of flowing water that is flowed over the painted laser shock peened surface 54 and the paint is ablated generating plasma which results in shock waves on the surface of the material. These shock waves are redirected towards the painted surface by the curtain of flowing water to generate travelling shock waves (pressure waves) in the material below the painted surface. The amplitude and quantity of these shockwave determine the depth and intensity of compressive stresses. The paint is used to protect the target surface and also to generate plasma. Ablated paint material is washed out by the curtain of flowing water. This and other methods for laser shock peening are disclosed in greater detail in U.S. patent Ser. No. 08/319,346, entitled "LASER SHOCK PEENED ROTOR COMPONENTS FOR TURBOMACHINERY", and in U.S. patent Ser. No. 08/363,362, entitled "ON THE FLY LASER SHOCK PEENING" which are both incorporated herein by reference.

Referring more specifically to FIG. 3, the present invention includes a compressor blade 8 construction with either the leading edge LE or the trailing edge TE sections or both the leading edge LE and the trailing edge TE sections having laser shock peened surfaces 54 and associated pre-stressed regions 56 with deep compressive residual stresses imparted by laser shock peening (LSP) as disclosed above. The laser shocked surface and associated pre-stressed region on the trailing edge TE section is constructed similarly to the leading edge LE section as described above. Nicks on the leading edge LE tend to be larger than nicks on the trailing edge TE and therefore the first width W1 of the leading edge section 50 may be greater than the second width W2 of the trailing edge section 70. By way of example W1 and W2 may each be about 20% of the length of the chord C.

Figure 4:
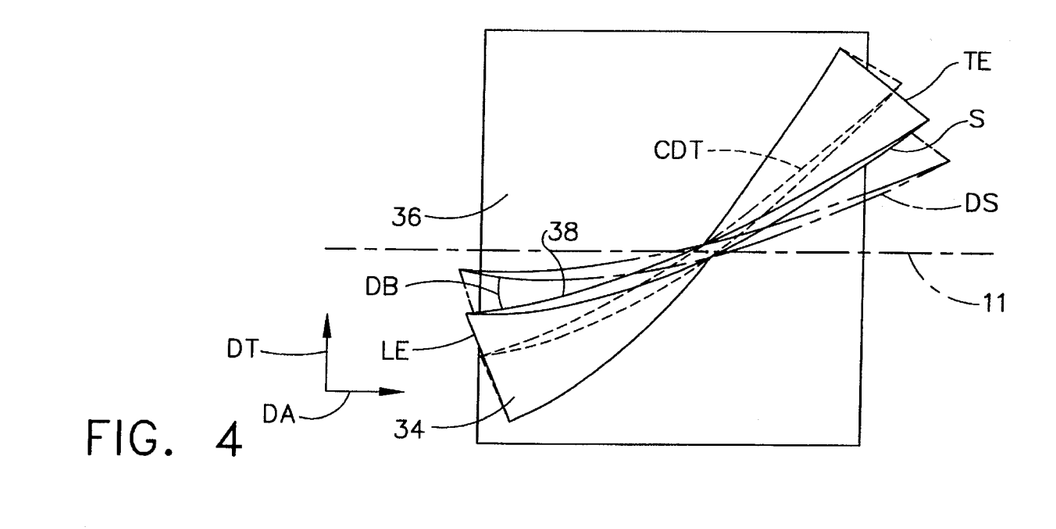
FIG. 4 is a cross sectional view through a tip end section of the compressor blade taken along line 3—3 as illustrated in FIG. 2 overlayed with a cross sectional view through a tip end section of a conventional non-laser shock peened compressor blade taken along the same line 3—3 illustrated in FIG. 2.

Because compressor blades are generally very thin laser shock peening the compressor blade 8 to form the laser shock peened surfaces 54 and associated pre-stressed regions 56 with deep compressive residual stresses as disclosed above can cause compressor blade distortion as illustrated in FIG. 4. The distortion is generally thought to be caused by the curling of the airfoil due to the deep compressive stresses imparted by the laser shock peening process. The distortion is distributed along the blades edges going from 0 at the base of the airfoil at the platform 36 to a maximum at the tip 38. A cumulative effect from the platform 36 of the airfoil to its tip 38 is illustrated in the form of three types of distortion at the blade tip 38. The first type of distortion is in the blade twist defined earlier as the chord angle B with respect to the engine centerline 11 and is illustrated as a blade twist distortion DB between a designed airfoil cross-sectional shape S drawn with a solid line and a distorted shape DS drawn with a dashed line. Second and third types of distortion are axial and tangential leaning illustrated as axial and tangential displacement DA and DT respectively of the leading edge LE and/or the trailing edge TE of the airfoil 34 at the tip 38. A fourth type of distortion is the curvature of the mean-line ML. The mean-line ML can generally be described by a radius of curvature R which indicates how sharp the curvature is between the leading edge LE and the trailing edge TE of the airfoil 34. The distortion may either increase or decrease the radius of curvature R and sharpness of the curvature.

There are two means by which the present invention may be used to overcome the distortion problem or counter the distortion of the airfoil due to the laser shock peening. The first is to control the patterns and amounts of laser energy used to limit the distortion to within acceptable limits or tolerances. The second is to counteract the distortion by producing contra-distorting features in the airfoil such as a contra-distorting twist or patterns of laser shocked peened regions in the airfoil.

Figure 5:
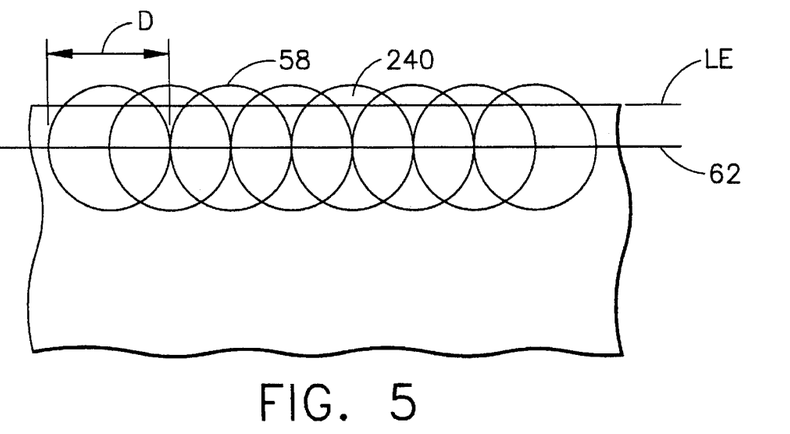
FIG. 5 is a schematic side view of a first laser beam pattern of laser shock peened area on the leading edge of the compressor blade illustrated in FIG. 3.
Figure 6:
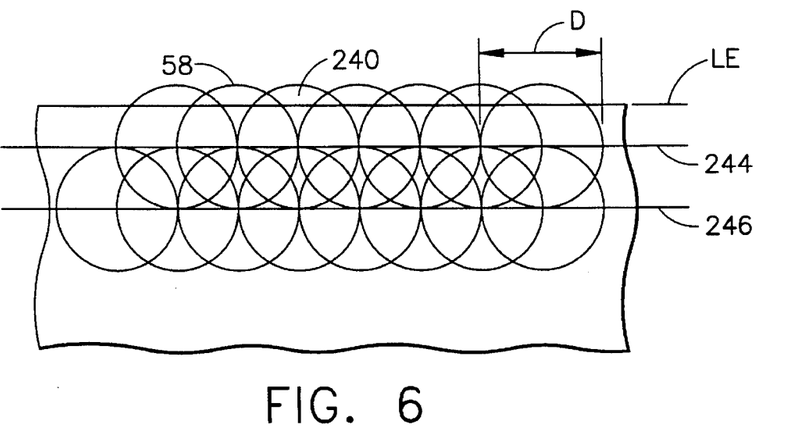
FIG. 6 is a schematic side view of a second laser beam pattern of laser shock peened area on the leading edge of the compressor blade illustrated in FIG. 3.
Figure 7:
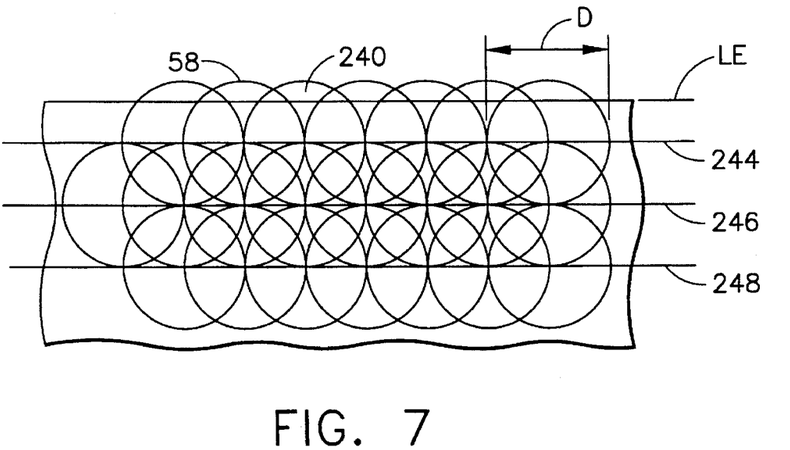
FIG. 7 is a schematic side view of a third laser beam pattern of laser shock peened area on the leading edge of the compressor blade illustrated in FIG. 3.

A number of different methods may be used to limit the amount of distortion exhibited by the compressor blade due to the laser shock peening of the leading and/or trailing edges. One of the variables that can be controlled is strength or power of the laser beam used by during the laser shock peening process. Laser shock peening has, for example, been tested on a General Electric LM-5000 compressor blade using a 5.6 millimeter diameter spot for the focused laser beam and varying the power from between 100 and 200 joules per square centimeter. Three levels of laser power were used, 100, 150 and 200 joules per centimeter square. FIGS. 5, 6 and 7 illustrate, by way of example, three types of laser beam patterns used to form circular laser shocked areas 240 which are used to form the peened surfaces 54 and their associated pre-stressed regions 56. The circular laser shocked areas 240 generally are generally arranged in patterns of overlapping circular laser shocked areas 240 centered along first, second and third centering lines 244, 246, and 248 respectively. The circular laser shocked areas 240 represent the areas hit by a laser beam spot 58 having a diameter D during the laser shock peening process. In addition, the spot patterns were varied to see the result on the amount of distortion that the blades exhibited. The first exemplary pattern includes a centerline parallel to the leading edge LE and was offset from the leading edge by 1.77 millimeters so that the outer edge of the spots were beyond the leading edge itself. A second pattern used a 50% overlap. A second pattern has two rows of laser spots. The first row is centered on the leading edge and the second row is centered 2.8 millimeters from the leading edge. A third pattern centers a third row of 50% overlapping spots along a third centerline, 1.4 millimeter from the leading edge or halfway between the first centerline and the second centerline of the laser spots. As expected, the stress concentration factor Kt generally decreases within increasing power. Furthermore, the more rows the lower the stress concentration factor. As expected, the amount of distortion increases with the greater amount of power and the larger or the greater number of passes. An additional factor to be considered is the amount of overlap between the various rows, where it appears that the greater the overlap, the greater the amount of distortion. Therefore, one can limit the amount of distortion by controlling these parameters as well as perhaps others. These distortion limiting parameters are (1) the amount of power per square centimeter used for the laser spot, (2) the amount of overlap such as may be based on spacing between laser spots in a given row and the number and the spacing between overlapping rows of laser spots, and (3) the number of passes or times each spot is hit on the laser shocked peened surface.

Contra-distorting features (or means for counteracting the distortion due to laser shock peening) in the airfoil 34 such as a contra-distorting twist or asymmetric applications of laser shocked peened regions in the airfoil 34 may be used to overcome distortion problems by counteracting the distortion. Which contra-distorting feature or means for counteracting the distortion due to laser shock peening may have to be decided by empirical, semi-empirical, or analytical methods or a combination of any of these methods. The amount of power, the number of times each laser beam spot is hit, the amount of overlap, the number as well as the particular contra-distorting feature or features best suited for a particular application requires experimentation and development. The object is to design for a desired Kt in the leading and/or trailing edges of the airfoil.

Figure 2A:
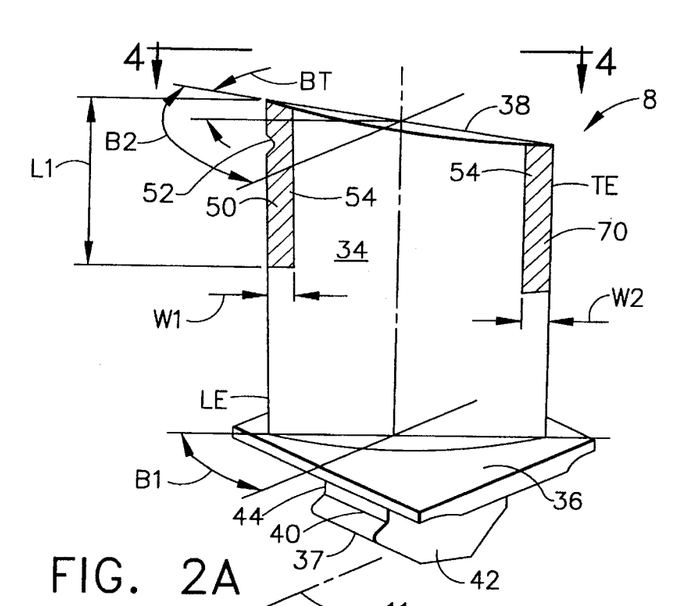
FIG. 2A is a perspective illustrative view of an alternative aircraft gas turbine engine compressor blade including a laser shock peened radially extending portion of the leading edge in accordance with the present invention.

One contra-distorting feature or means for counteracting the distortion due to laser shock peening is to only laser shock peen a patch of the leading edge LE near the tip of the airfoil 34 such as the laser shocked surface 54. The patch may extend over as much as the top one half of the airfoil and over a width (such as W1 as illustrated in FIG. 2A) of about 20% of the chord length from the leading. The overall distortion effect is diminished because the rest of the unshocked radial length of the blade tends to counteract the distortion. Another means for counteracting the distortion due to laser shock peening is to only laser shock peen one side of the airfoil, either the pressure side or the suction side.

Illustrated in FIG. 4 is another means for counteracting the distortion due to laser shock peening by pre-twisting the airfoil 34 such that the laser shock peening will twist it in an opposite manner such that the finished airfoil will be within acceptable tolerances or pre-determined design limits with regards to it's designed twist. The airfoil 34 is pre-twisted, illustrated as a blade pre-twist shape CDT drawn with a dashed line such that after the laser shock peening the airfoil will have the designed airfoil cross-sectional shape S.

Figure 3A:
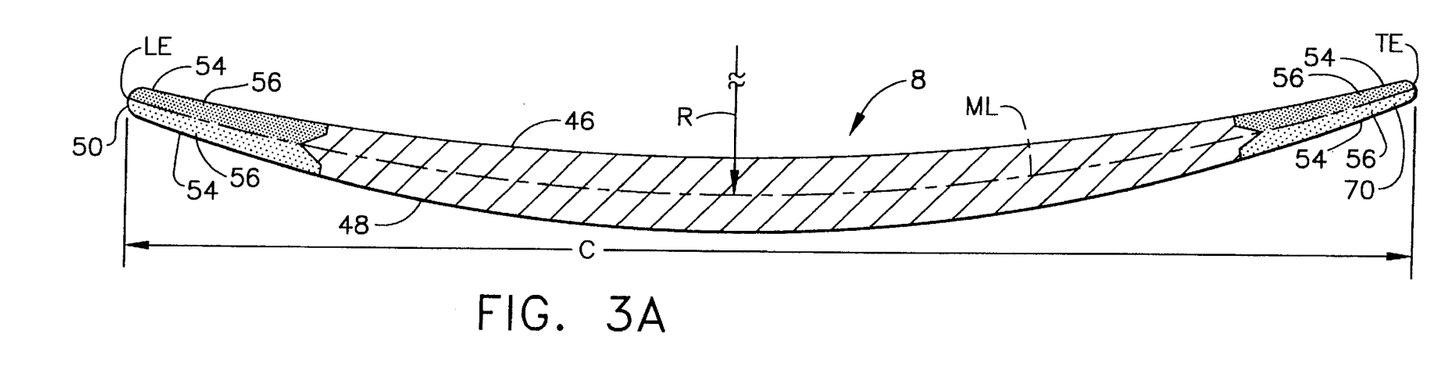
FIG. 3A is a cross sectional view through the compressor blade taken along line 3—3 as illustrated in FIG. 2 with one alternative means for controlling distortion of a laser shock peened compressor blade.

The method by which the airfoil is laser shock peened can also be used to counteract the distortion due to laser shock peening such as laser shock peening the airfoil from the platform or base to the tip of the airfoil along a strip adjoining the leading and/or the trailing edge. One method is illustrated in FIG. 3A whereby unbalanced energies or fluences may be used on different sides of the airfoil 34. The airfoil is laser shock peened on both the pressure and the suction sides but with unbalanced energies or fluences on different sides illustrated by the difference in shading between the different laser shock peened surfaces 54 and pre-stressed regions 56 of the pressure side 46 and the suction side 48 of the airfoil 34. For example in a range of 100–200 joules/cm$^2$ one side can be laser shock peened using a power in the lower end of this range and the other side can be laser shock peened using a power in the upper end of this range. Alternatively or additionally one side can be laser shock peened at each point more times than the side. If multiple rows of overlapping laser shock peened spots are used the adjacent rows should be laser shock peened in order staring with the row furthest from the leading edge.

While the preferred embodiment of the present invention has been described fully in order to explain its principles, it is understood that various modifications or alterations may be made to the preferred embodiment without departing from the scope of the invention as set forth in the appended claims.

We claim:

1. A gas turbine engine compressor blade comprising:

a metallic airfoil having a leading edge and a trailing edge, at least one laser shock peened surface on at least one side of said airfoil of at least one of said leading and trailing edges, said laser shock peened surface extending radially along at least a portion of and extending chordwise from said one of said edges, a region having deep compressive residual stresses imparted by laser shock peening (LSP) extending into said airfoil from said laser shock peened surface, and a means to counter distortion of said airfoil due to said laser shock peening.

2. A compressor blade as claimed in claim 1 wherein;

said airfoil extends radially outward from a blade platform to a blade tip, said airfoil includes a pressure side and a suction side, said means comprises a laser shock peened patch near said tip, and said patch comprises a first one of said at least one laser shock peened surface on said pressure side and a second one of said at least one laser shock peened surface on said suction side wherein said first and second ones of said at least one laser shock peened surfaces extend radially from said tip along said portion of said leading edge.

3. A compressor blade as claimed in claim 2 wherein said portion is about 50% of a distance from said tip to said platform.

4. A compressor blade as claimed in claim 2 wherein said laser shock peened regions extending into said airfoil from said laser shock peened surfaces are formed by simultaneously laser shock peening both sides of said patch.

5. A compressor blade as claimed in claim 1 wherein said compressor blade is a repaired compressor blade.

6. A compressor blade as claimed in claim 1 wherein;

said airfoil extends radially outward from a blade platform to a blade tip, said airfoil includes a pressure side and a suction side, said means comprises compression side and suction side patterns of circular laser shocked areas wherein said suction side pattern is different from said compression side pattern, and each of said patterns includes overlapping rows of circular laser shocked areas, each of said rows having overlapping circular laser shocked areas and generally equally spaced apart linearly aligned center points.

7. A compressor blade as claimed in claim 6 wherein said suction side and compressor side patterns have a different number of overlapping rows.

8. A compressor blade as claimed in claim 6 wherein said suction side and compressor side patterns have suction side and compressor side circular laser shocked areas respectively and said suction side circular laser shocked areas are formed with a first laser beam having a first strength and said compressor side circular laser shocked areas are formed with a second laser beam wherein one of said first and second strengths is stronger than the other.

9. A compressor blade as claimed in claim 1 wherein said airfoil is formed with a pre-twist prior to formation of said at least one laser shock peened surface such that said airfoil has a final pre-determined twist after said airfoil is laser shock peened that is different from said pre-twist.

10. A compressor blade as claimed in claim 1 wherein said means comprises;

overlapping rows of circular laser shocked areas, each of said rows having overlapping circular laser shocked areas and generally equally spaced apart linearly aligned center points that are generally parallel to said leading edge, and wherein said rows are laser shock peened in order starting with a row furthest away from said leading edge.

11. A compressor blade as claimed in claim 1 wherein said airfoil extends radially outward from a blade platform to a blade tip and said means comprises;

at least one overlapping row of circular laser shocked areas having overlapping circular laser shocked areas and generally equally spaced apart linearly aligned center points that are generally parallel to said leading edge extending from said tip to said platform, and wherein said rows are laser shock peened radially outward in order starting from said platform to said tip.

12. A compressor blade as claimed in claim 1 wherein;

said airfoil extends radially outward from a blade platform to a blade tip, said airfoil includes a pressure side and a suction side, said means comprises a laser shock peened patch near said tip, and said patch comprises a first one of said at least one laser shock peened surface on said pressure side and a second one of said at least one laser shock peened surface on said suction side wherein said first and second ones of said at least one laser shock peened surfaces extend radially from said tip along said portion of said trailing edge.

13. A compressor blade as claimed in claim 1 wherein;

said airfoil extends radially outward from a blade platform to a blade tip, said airfoil includes a pressure side and a suction side, a first means and a second means comprising first and second laser shock peened patches respectively near said tip, said first and second patches having first and second ones of said at least one laser shock peened surface on said pressure side and second ones of said at least one laser shock peened surface on said suction side wherein said first and second ones of said at least one laser shock peened surfaces extend radially from said tip along portions of said leading and trailing edges.

14. A method for laser shock peening a gas turbine engine compressor bade, said method comprising the following steps:

laser shock peening at least one laser shock peened surface on at least one side of a metallic airfoil having a leading edge and a trailing edge and a pressure side and a suction side, laser shock peening the laser shock peened surface so that it extends radially along at least a portion of said leading edge and extends chordwise from the leading edge and forms a region having deep compressive residual stresses imparted by the laser shock peening extending into the airfoil from the laser shock peened surface, and a step for counteracting distortion of the airfoil caused by said laser shock peening steps.

15. A method as claimed in claim 14 wherein said step to counteracting distortion comprises forming a pre-twist in the airfoil of the blade before laser shock peening the airfoil such that during the laser shock peening steps the airfoil twists counter to the pre-twist to form the airfoil with a predetermined final twist that is different from the pre-twist.

16. A method as claimed in claim 16 wherein said step to counter distortion comprises laser shock peening only a patch of the airfoil near the leading edge of the airfoil extending radially from the tip along a portion of the leading edge.

17. A method as claimed in claim 16 wherein said patch extends about 50% of the distance from the tip to the platform.

18. A method as claimed in claim 16 wherein said patch includes laser shock peened surfaces on both sides of the airfoil and regions extending into said airfoil from both sides of the airfoil and said laser shock peened regions and surfaces are formed by simultaneously laser shock peening both sides of said patch.

19. A method as claimed in claim 14 further comprising the step of laser shock peening the laser shock peened surface so that it extends radially along about the entire length of the edge and wherein said step to counter distortion comprises laser shock peening the laser shock peened surface from the platform to the tip of the airfoil.

20. A method as claimed in claim 19 wherein the edge is the leading edge of the airfoil.

21. A method as claimed in claim 14 wherein a laser beam is fired to produce the laser shock peened surface with more than one row of overlapping circular laser beam spots having generally equally spaced apart linearly aligned center points wherein adjacent rows of the spots overlap and said step to counter distortion comprises laser shock peening the rows in order starting with a row furthest away from the leading edge.

22. A method as claimed in claim 21 wherein both sides of the airfoil are laser shock peened simultaneously along the edge to form laser shock peened surfaces on both sides of the airfoil and regions extending into the airfoil from both sides of the airfoil.

23. A method as claimed in claim 14 wherein said step to counter distortion comprises using a different laser fluence on each of the two sides of the airfoil.

24. A method as claimed in claim 14 wherein said step to counter distortion comprises using a different pattern of overlapping rows of overlapping circular laser beam spots having generally equally spaced apart linearly aligned center points on each of the two sides of the airfoil.

* * * * *